(12) United States Patent  
Mikashima (10) Patent No.: US 10,343,435 B2  
(45) Date of Patent: Jul. 9, 2019

(54) INKJET RECORDING APPARATUS

(71) Applicant: KYOCERA Document Solutions Inc., Osaka (JP)

(72) Inventor: Katsuo Mikashima, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/016,731

(22) Filed: Jun. 25, 2018

(65) Prior Publication Data

US 2018/0370264 A1    Dec. 27, 2018

(30) Foreign Application Priority Data

Jun. 26, 2017  (JP) .................................. 2017-124287

(51) Int. Cl.

| | |
|---|---|
| B41J 29/393 | (2006.01) |
| B41J 2/045 | (2006.01) |
| B41J 13/00 | (2006.01) |
| B41J 2/21 | (2006.01) |
| G06K 15/02 | (2006.01) |
| H04N 1/60 | (2006.01) |

(52) U.S. Cl.
CPC ......... *B41J 29/393* (2013.01); *B41J 2/04508* (2013.01); *B41J 2/04586* (2013.01); *B41J 2/2135* (2013.01); *B41J 2/2139* (2013.01); *B41J 2/2142* (2013.01); *B41J 2/2146* (2013.01); *B41J 13/00* (2013.01); *G06K 15/027* (2013.01); *H04N 1/6033* (2013.01)

(58) Field of Classification Search
CPC .. B41J 2/04508; B41J 2/04586; B41J 2/2135; B41J 2/2139; B41J 2/2142; B41J 2/2146; B41J 13/00; B41J 129/393; H04N 1/4057; H04N 1/6033; G06K 15/027
See application file for complete search history.

(56) References Cited

U.S. PATENT DOCUMENTS

2009/0085952 A1*  4/2009  Yamazaki ............. B41J 2/2142
                                                    347/19

FOREIGN PATENT DOCUMENTS

JP         2004-009474 A      1/2004

\* cited by examiner

*Primary Examiner* — Thinh H Nguyen (74) *Attorney, Agent, or Firm* — Studebaker & Brackett PC (57) ABSTRACT

An inkjet recording apparatus includes a plurality of nozzles, storage, a first reading section, a first computing section, a selection section, and a controller. The storage stores first information and first pattern image data representing a first pattern image. The first reading section scans a sheet to generate sheet data. The first computing section computes positions of both edge portions of the sheet in a main scanning direction based on the sheet data. The selection section selects a plurality of used nozzles. The controller directs the used nozzles to form a second pattern image on the sheet.

6 Claims, 11 Drawing Sheets

INKJET RECORDING APPARATUS

INCORPORATION BY REFERENCE

The present application claims priority under 35 U.S.C. § 119 to Japanese Patent Application No. 2017-124287, filed on Jun. 26, 2017. The contents of this application are incorporated herein by reference in their entirety.

BACKGROUND

The present disclosure relates to an inkjet recording apparatus.

An inkjet recording apparatus that prints a test pattern of perpendicular lines on a sheet is known. Printing is performed by shifting printing nozzles when printing the test pattern on each page or within a given page.

SUMMARY

An inkjet recording apparatus according to one aspect of the present disclosure includes a plurality of nozzles, storage, a first reading section, a first computing section, a selection section, and a controller. The nozzles eject ink. The storage stores first information and first pattern image data representing a first pattern image. The first reading section scans a sheet to generate sheet data representing the sheet. The first computing section computes positions of both edge portions of the sheet in a main scanning direction based on the sheet data. The selection section selects, from among the nozzles, a plurality of used nozzles corresponding to a length of the sheet in the main scanning direction, based on the positions of both of the edge portions of the sheet in the main scanning direction and the first information. The controller directs the used nozzles to form a second pattern image on the sheet. The first information indicates, from among the nozzles, a corresponding nozzle for each of a plurality of reading positions in the first reading section with respect to the main scanning direction. The first pattern image exhibits a test pattern for the nozzles. The second pattern image exhibits a part of the first pattern image in which the test pattern for the used nozzles is formed.

DETAILED DESCRIPTION

Figure 1:
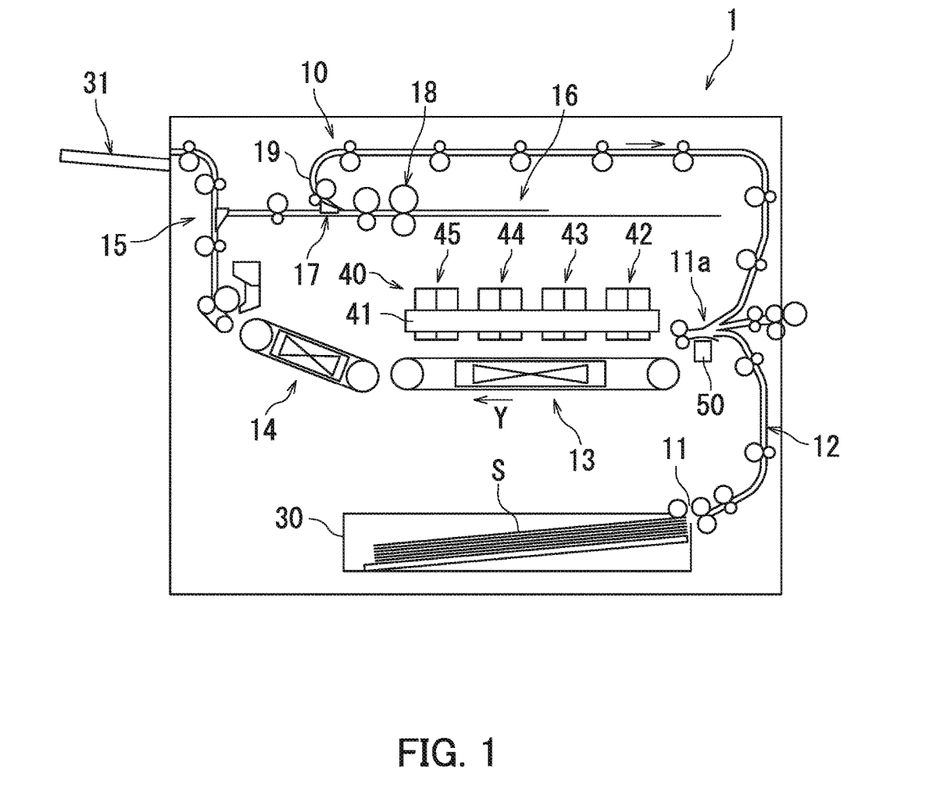
FIG. 1 is a schematic diagram illustrating a configuration of an inkjet recording apparatus according to an embodiment of the present disclosure.

An inkjet recording apparatus 1 according to an embodiment of the present disclosure will be described with reference to FIG. 1. FIG. 1 is a schematic diagram illustrating a configuration of the inkjet recording apparatus 1.

As illustrated in FIG. 1, the inkjet recording apparatus 1 includes a conveyor device 10, a cassette 30, an ejection table 31, an image forming section 40, and a reading section (first reading section and second reading section) 50.

The conveyor device 10 includes a feeding section 11, a sheet guiding section 12, a first belt conveyance section 13, a second belt conveyance section 14, a first guiding section 15, a reverse guiding section 16, a branching section 17, a reversing section 18, and a second guiding section (guiding section) 19.

The cassette 30 houses a sheet S. The feeding section 11 sends the sheet S in the cassette 30 out to the sheet guiding section 12. Examples of the sheet S include plain paper, thick paper, an overhead projector (OHP) transparency, an envelope, a postcard, and an invoice.

The sheet guiding section 12 guides the sheet S to the image forming section 40. Specifically, the sheet guiding section 12 guides the sheet S sent out from the cassette 30 to the image forming section 40 through the first belt conveyance section 13. The image forming section 40 ejects ink on to the sheet S to form an image on the sheet S. The second belt conveyance section 14 conveys the sheet S passed through the image forming section 40. The first guiding section 15 guides the sheet S sent out from the second belt conveyance section 14 to the ejection table 31. As a result, the sheet S is ejected to the ejection table 31.

The reverse guiding section 16 branches from the first guiding section 15. The branching section 17 is located in the reverse guiding section 16. The branching section 17 guides the sheet S sent out from the first guiding section 15 to the reverse guiding section 16 toward the reversing section 18.

The reversing section 18 is located in the reverse guiding section 16. The reversing section 18 reverses a movement direction of the sheet S sent out from the branching section 17 to return the sheet S to the branching section 17. The branching section 17 guides the sheet S sent out from the reversing section 18 to the second guiding section 19. The second guiding section 19 guides the sheet S to a return position 11a. Thus, the sheet S passed through the image forming section 40 is guided to the return position 11a through the second guiding section 19. The return position 11a is located in the sheet guiding section 12. The return position 11a is also located upstream of the image forming section 40 in a conveyance direction Y of the sheet S. The conveyance direction Y of the sheet S means a movement direction of the sheet S when the image forming section 40 forms an image on the sheet S. In the following, the conveyance direction Y of the sheet S may be referred to as the conveyance direction Y.

The reverse and obverse surfaces of the sheet S are inverted when the sheet S is guided to the return position 11a by the second guiding section 19. The sheet S is reconveyed to the image forming section 40 after being guided to the return position 11a. As a result, the image forming section 40 can form an image on the reverse side of the sheet S.

The reading section 50 is located between the image forming section 40 and the return position 11a. An example of the reading section 50 includes a light emitter such as a light-emitting diode (LED) and an imaging section such as an image sensor. The light emitter and the imaging section read an image formed on the sheet S. The reading section 50 is a contact image sensor (CIS) unit according to the present embodiment. Note that a charge-coupled device (CCD) sensor and a lens system may be equipped instead of the CIS unit. The reading section 50 scans the sheet S to generate sheet data representing the sheet S. The reading section 50 according to the present embodiment is a line sensor that scans the sheet S in a main scanning direction X. The main scanning direction X is perpendicular to the conveyance direction Y.

Figure 2:
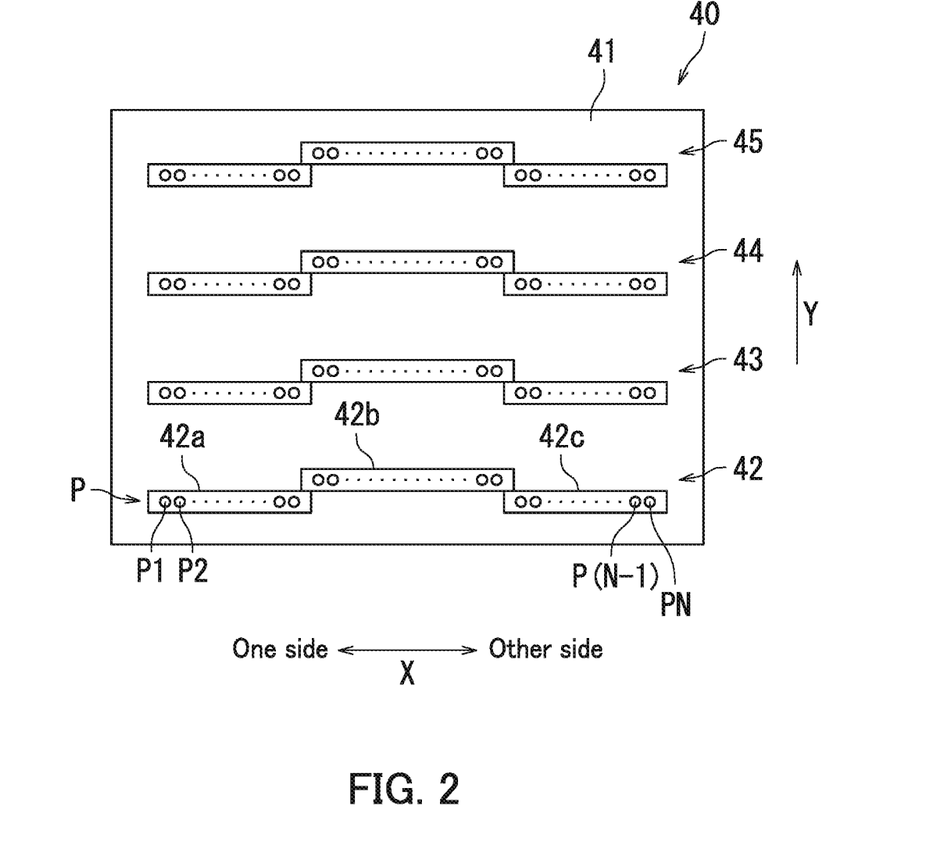
FIG. 2 is a diagram in which a side of an image forming section is viewed from a first belt conveyance section.

Next, the image forming section 40 will be described with reference to FIGS. 1 and 2. FIG. 2 is a diagram in which a side of the image forming section 40 is viewed from the first belt conveyance section 13.

As illustrated in FIGS. 1 and 2, the image forming section 40 includes a housing 41 and a plurality of head sections. According to the present embodiment, the head sections include a first head section 42, a second head section 43, a third head section 44, and a fourth head section 45. The housing 41 supports the head sections. Each head section is located opposite the first belt conveyance section 13. The head sections are arranged in the conveyance direction Y.

The head sections share a similar configuration. Accordingly, the configuration of the first head section 42 among the head sections will be described, and description of the configuration of the other head sections will be omitted.

The first head section 42 includes a plurality of nozzles P and a plurality of heads. The heads include a first head 42a, a second head 42b, and a third head 42c, for example. The heads are staggered in the main scanning direction X. Each head section is provided with the plurality of nozzles P. The nozzles P include every nozzle from a first nozzle P1 to an Nth nozzle PN. N is an integer that is at least equal to 2. N is a constant. When viewed from the conveyance direction Y, the nozzles P are arranged in the main scanning direction X. The nozzles P are arranged in the main scanning direction X from one side to the other side in the following order: the first nozzle P1, a second nozzle P2, . . . , and the Nth nozzle PN. That is, when counting the nozzles P in order from one side in the main scanning direction X, an nth nozzle Pn is located in an nth position. n is an integer that is at least equal to 1 and at most equal to N. In detail, n is a variable indicating all integers from 1 to N.

Each of the heads, for example, transmits pressure to ink in the nth nozzle Pn by altering the shape of a piezoelectric element, and agitates a meniscus to create an ink droplet. As a result, the nth nozzle Pn ejects the ink.

Inks are supplied to the respective head sections. The color of the inks differs according to the head section. A black ink is supplied to the first head section 42, for example. A cyan ink is supplied to the second head section 43, for example. A magenta ink is supplied to the third head section 44, for example. A yellow ink is supplied to the fourth head section 45, for example. Thus, the nozzles P equipped in the first head section 42 eject the black ink. The nozzles equipped in the second head section 43 eject the cyan ink. The nozzles equipped in the third head section 44 eject the magenta ink. The nozzles equipped in the fourth head section 45 eject the yellow ink. As a result, a color image in which one or more of the cyan, magenta, yellow, and black inks are deposited is formed on the sheet S. To deposit means to attach the inks to the sheet S.

Figure 3:
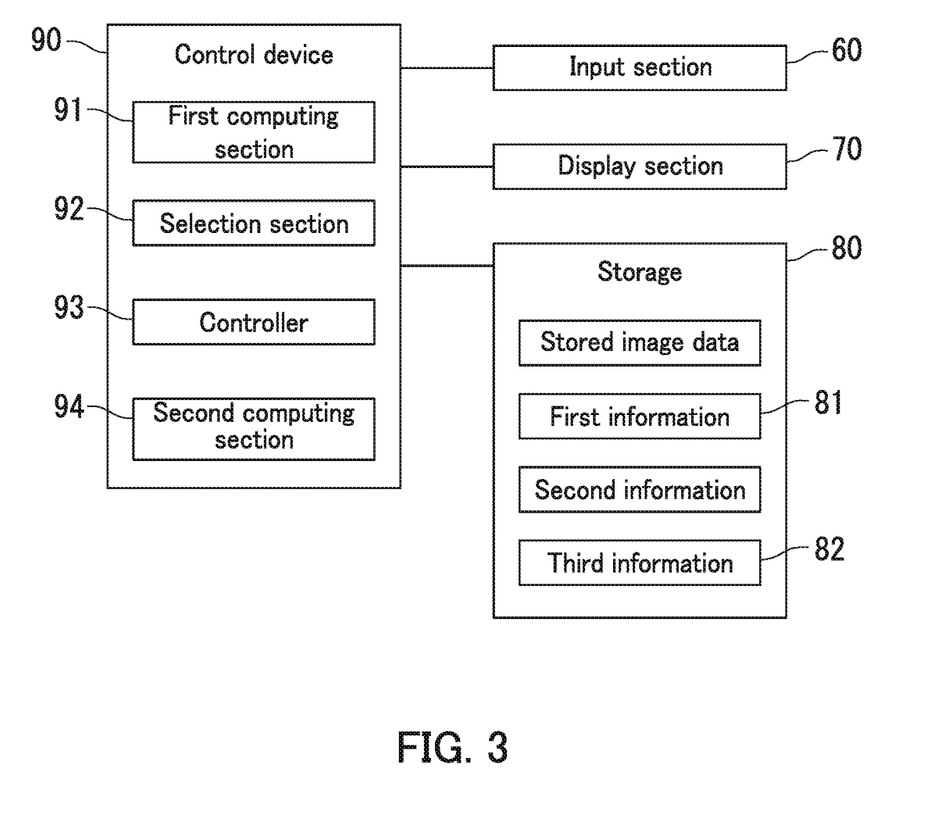
FIG. 3 is a block diagram illustrating the inkjet recording apparatus.

Next, the inkjet recording apparatus 1 will be further described with reference to FIG. 3. FIG. 3 is a block diagram illustrating the inkjet recording apparatus 1.

As illustrated in FIG. 3, the inkjet recording apparatus 1 further includes an input section 60, a display section 70, storage 80, and a control device 90.

The input section 60 receives an instruction for the inkjet recording apparatus 1 from a user. The input section 60 includes either or both a touch panel and a group of operation keys, for example. The input section 60 is located on a casing of the inkjet recording apparatus 1, for example.

Examples of the display section 70 include a liquid crystal display (LCD) and an organic electroluminescent display (ELD). The display section 70 may be integrated with the input section 60. Specifically, the input section 60 and the display section 70 may be configured as a touch panel. The display section 70 is located on the casing of the inkjet recording apparatus 1, for example. Note that the display section 70 may be configured as a separate body from the casing.

The storage 80 includes a storage device. The storage device includes a main storage device such as read-only memory (ROM) or random-access memory (RAM) (semiconductor memory, for example), and may further include an auxiliary storage device (a hard disk drive, for example). Either or both of the main storage device and the auxiliary storage device stores various computer programs to be executed by the control device 90.

The storage 80 stores first information 81, second information, third information 82, and stored image data (first pattern image data and reference image data) representing a stored image 100.

The control device 90 includes a processor such as a central processing unit (CPU) or a microprocessing unit (MPU). The control device 90 controls elements of the inkjet recording apparatus 1. Specifically, the processor controls the conveyor device 10, the image forming section 40, the reading section 50, the input section 60, the display section 70, and the storage 80 by executing the computer programs stored in the storage device.

The control device 90 includes a first computing section 91, a selection section 92, a controller 93, and a second computing section 94. Specifically, the processor functions as the first computing section 91, the selection section 92, the controller 93, and the second computing section 94 by executing the computer programs stored in the storage device.

Next, the various information stored in the storage 80 will be described with reference to FIGS. 2 and 4 to 6.

Figure 4:
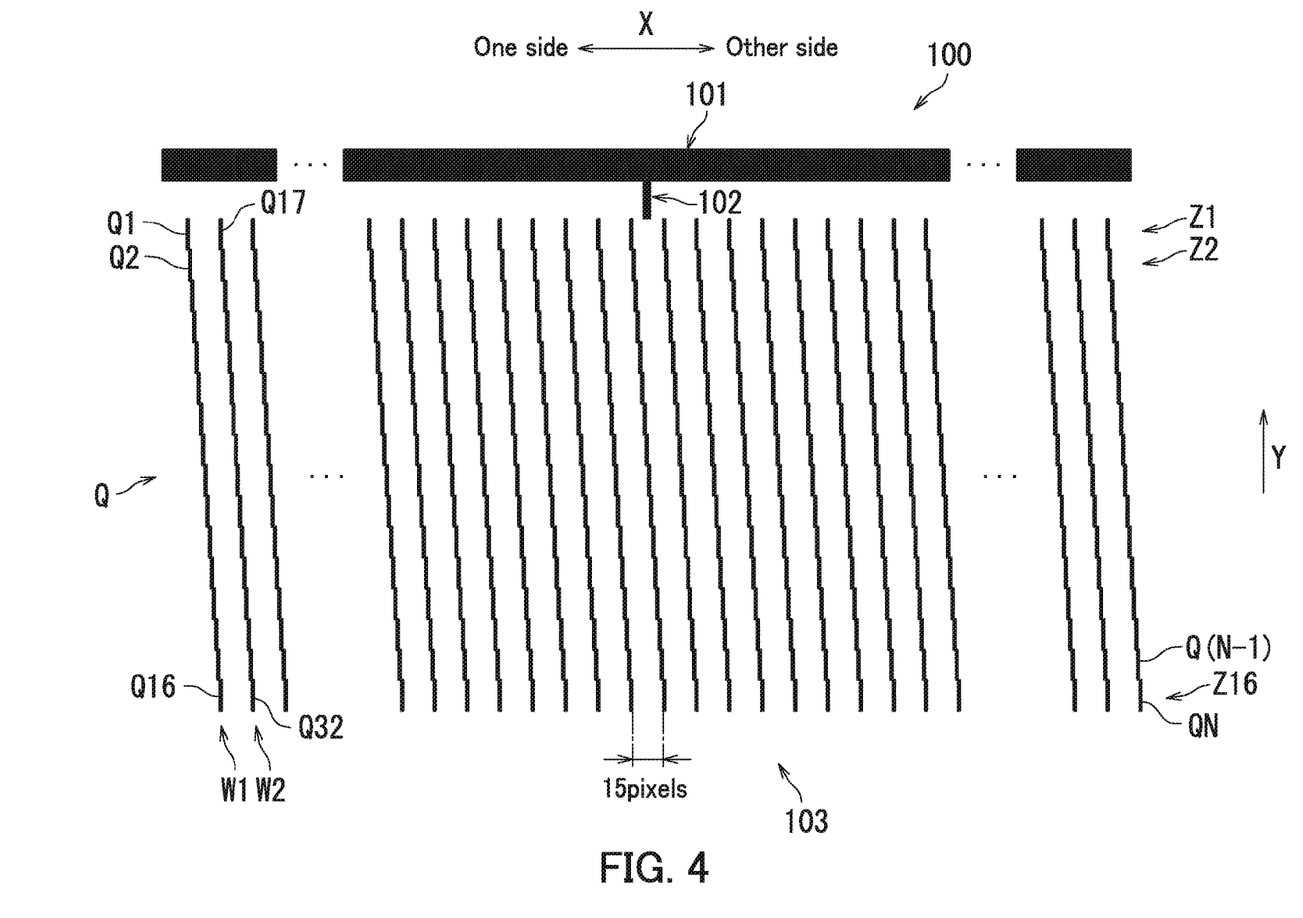
FIG. 4 is a diagram representing a stored image.

The stored image 100 will be described with reference to FIGS. 2 and 4. FIG. 4 is a diagram representing the stored image 100.

As illustrated in FIGS. 2 and 4, each pixel among a plurality of pixels included in the stored image 100 corresponds to a different nozzle among the nozzles P (from the first nozzle P1 to the Nth nozzle PN) equipped in the first head section 42. That is, each pixel among the plurality of pixels included in the stored image 100 represents an ink droplet ejected from a different nozzle among the nozzles P.

The stored image 100 specifically includes a first synchronized image 101, a first reference image (reference image) 102, and a first pattern image 103.

The first synchronized image 101 extends in the main scanning direction X. According to the present embodiment, the first synchronized image 101 has a shape that extends N pixels in the main scanning direction X. The first synchronized image 101 also extends a plurality of pixels in the conveyance direction Y.

The first reference image 102 is for establishing a position of the first pattern image 103. The first reference image 102 is located upstream of the first synchronized image 101 in the conveyance direction Y. The first reference image 102 extends upstream in the conveyance direction Y from a center portion of the first synchronized image 101 in the main scanning direction X. The first reference image 102 also extends a plurality of pixels in the main scanning direction X. The first reference image 102 is located downstream of the first pattern image 103 in the conveyance direction Y. The first reference image 102 is also located in a center portion of the first pattern image 103 in the main scanning direction X.

The first pattern image 103 exhibits a test pattern for the nozzles P. The test pattern is an image to examine whether or not each of a plurality of used nozzles (hereinafter referred to as used nozzles PX) is a non-ejecting nozzle. A non-ejecting nozzle means a nozzle that cannot eject ink due to a malfunction of the nozzle such as clogging of the nozzle or damage to the nozzle.

According to the present embodiment, a configuration will be described in which the first head section 42 among the head sections from the first head section 42 to the fourth head section 45 is checked for the presence of a non-ejecting nozzle. Note that the head sections other than the first head section 42 (the second head section 43, the third head section 44, and the fourth head section 45) are also checked for the presence of a non-ejecting nozzle in the same manner as the first head section 42. Accordingly, description of the head sections other than the first head section 42 will be omitted.

The first pattern image 103 includes a plurality of image portions Q. The number of image portions Q is equal to the number of nozzles P. According to the present embodiment, the number of image portions Q and the number of nozzles P are both N. Therefore, the image portions Q include every image portion from a first image portion Q1 to an Nth image portion QN.

An nth image portion Qn corresponds to the nth nozzle Pn. That is, the nth image portion Qn indicates a part of the test pattern for the nth nozzle Pn.

Each of the image portions Q has a shape extending a plurality of pixels in the conveyance direction Y. Each image portion Q extends one pixel in the main scanning direction X.

Continuing, an arrangement of the image portions Q will be described with reference to FIG. 4.

As illustrated in FIG. 4, the image portions Q are arranged from one side to the other side in the main scanning direction X in the following order: the first image portion Q1, a second image portion Q2, . . . , and the Nth image portion QN. That is, when counting the image portions Q in order from one side to the other side in the main scanning direction X, the nth image portion Qn is located in an nth position.

The nth image portion Qn is offset by one pixel in the main scanning direction X relative to an (n−1)th image portion Q(n−1). Furthermore, the nth image portion Qn is located in a different position in the conveyance direction Y than the (n−1)th image portion Q(n−1).

According to the present embodiment, the image portions Q are divided into a plurality of sets (a first set W1, a second set W2, . . . ). Each set includes a first predetermined number of image portions. The first predetermined number of image portions are arranged so as to be offset pixel by pixel in the main scanning direction X from a linear arrangement in the conveyance direction Y. According to the present embodiment, each set includes 16 image portions. The first set W1 includes every image portion from the first image portion Q1 to a 16th image portion Q16. The second set W2 includes every image portion from a 17th image portion Q17 to a 32nd image portion Q32. A Gth set WG includes every image portion from a (16G−15)th image portion Q(16G−15) to a 16Gth image portion Q16G. G is an integer that is at least equal to 1 and at most equal to (N/16). The sets are arranged in the main scanning direction X. According to the present embodiment, the sets are arranged in the main scanning direction X from one side to the other side in the following order: the first set W1, the second set W2, . . . . The sets are arranged parallel to each other with intervals located between adjacent sets. According to the present embodiment, the intervals between the adjacent sets each measure 15 pixels.

According to the present embodiment, the image portions Q are divided into a plurality of groups (a first group Z1, a second group Z2, . . . , and a 16th group Z16). Each group includes a second predetermined number of image portions arranged in the main scanning direction X. According to the present embodiment, each group includes (N/16) image portions.

According to the present embodiment, the groups include every group from the first group Z1 to the 16th group Z16. The groups are arranged in the conveyance direction Y. According to the present embodiment, the groups are arranged in the conveyance direction Y from downstream to upstream in the following order: the first group Z1, the second group Z2, . . . , and the 16th group Z16.

Continuing, the second information will be described with reference to FIG. 4.

As illustrated in FIG. 4, the second information indicates a position (pixel) of the first pattern image 103 relative to the first reference image 102. In detail, the second information indicates positions of the image portions Q (from the first image portion Q1 to the Nth image portion QN) relative to the first reference image 102. Accordingly, when the position of the first reference image 102 is known, the positions of the image portions Q can be deduced based on the second information.

Figure 5:
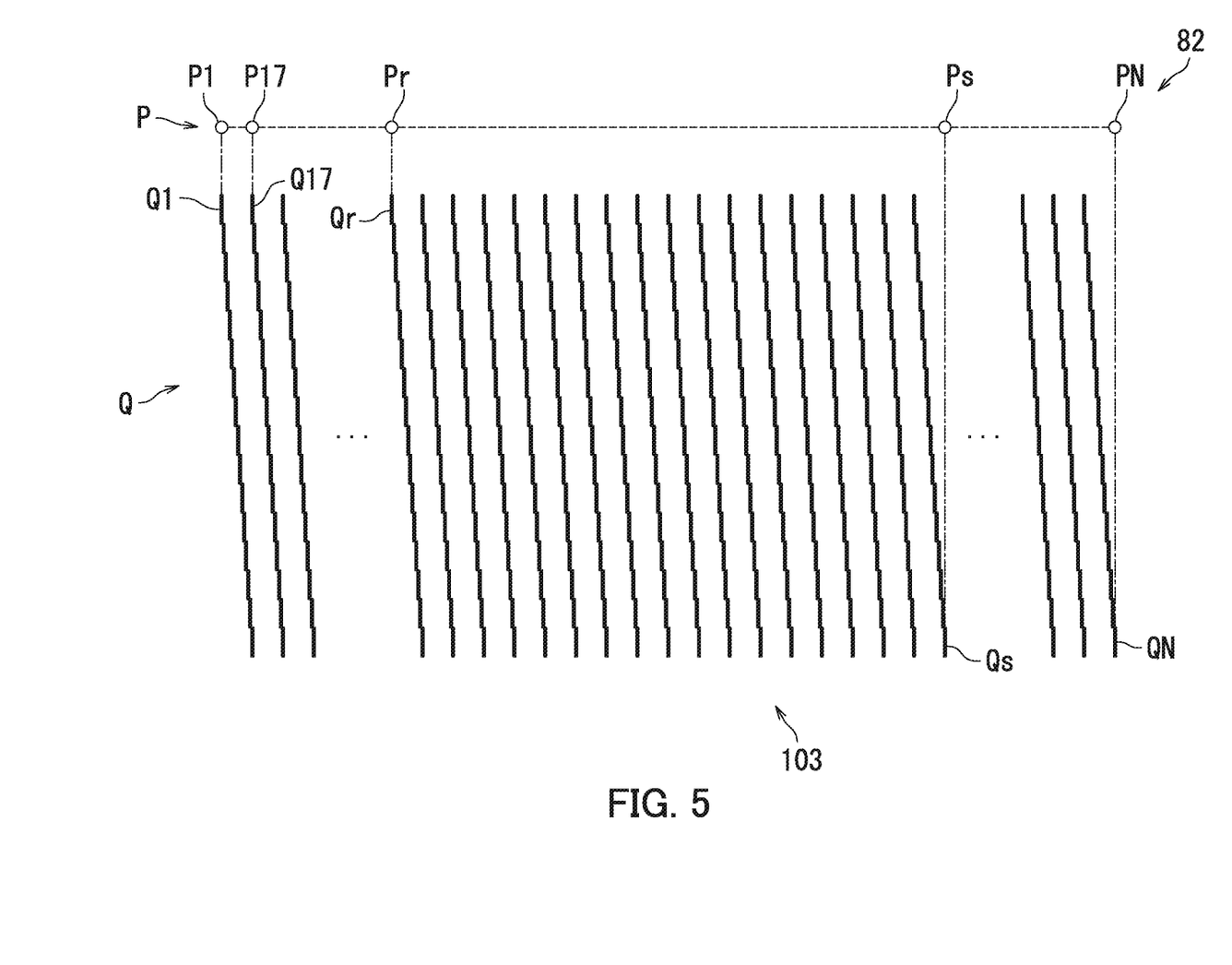
FIG. 5 is a conceptual diagram representing third information.

The third information 82 will be described with reference to FIG. 5. FIG. 5 is a conceptual diagram representing the third information 82.

As illustrated in FIG. 5, the third information 82 indicates that the nth image portion Qn corresponds to the nth nozzle Pn. That is, the third information 82 indicates that the part of the test pattern for the nth nozzle Pn is the nth image portion Qn. For example, an rth image portion Qr corresponds to an rth nozzle Pr. An sth image portion Qs corresponds to an sth nozzle Ps.

Figure 6:
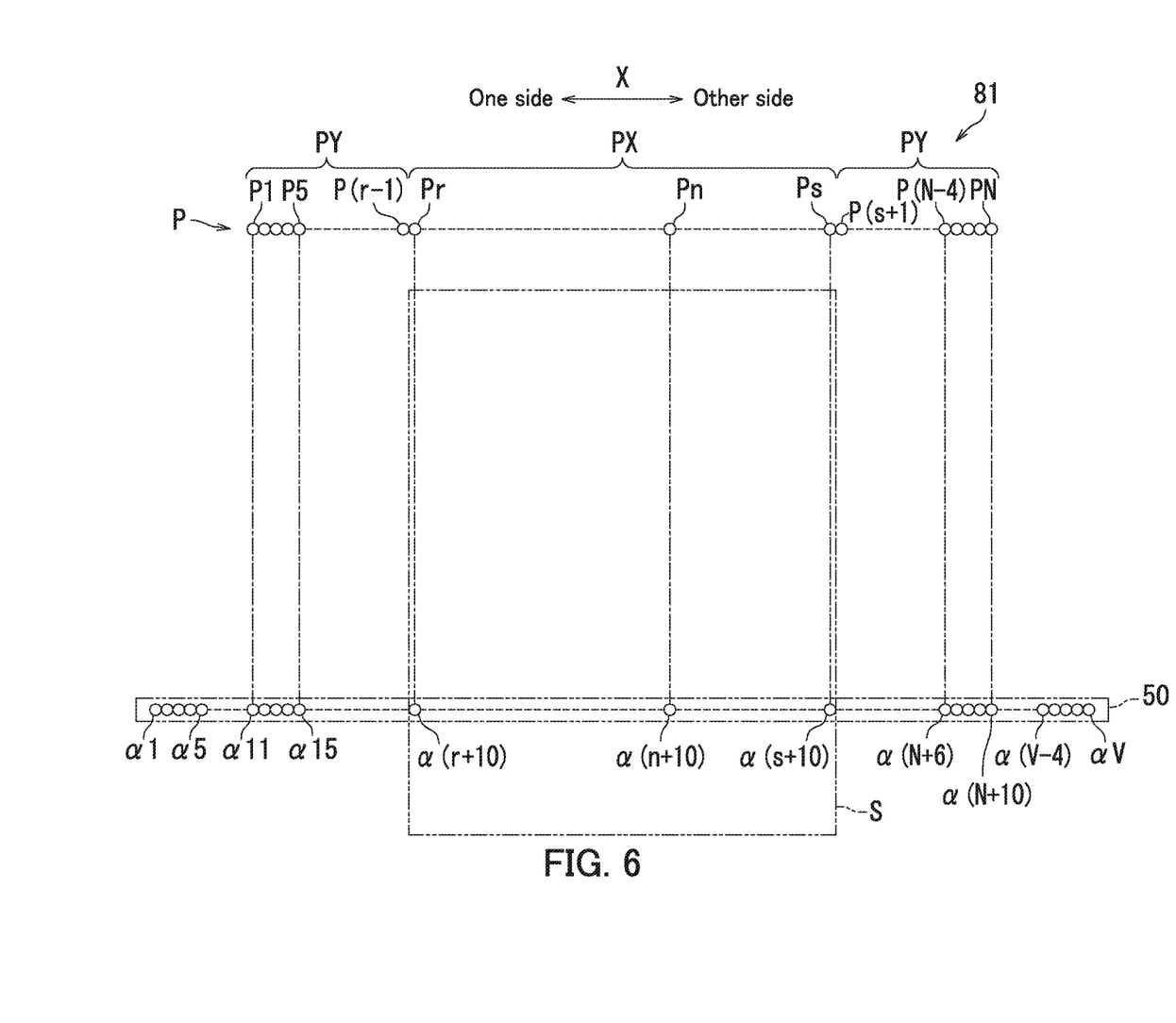
FIG. 6 is a conceptual diagram representing first information.

The first information 81 will be described with reference to FIG. 6. FIG. 6 is a conceptual diagram representing the first information 81.

As illustrated in FIG. 6, the first information 81 indicates nozzles corresponding to reading positions in the reading section 50 among the nozzles P for each reading position (pixel) in the reading section 50 in the main scanning direction X. The first information 81 is computed based on an amount of deviation between a center position of the nozzles P and a center position of the reading positions in the reading section 50, for example. A center position means a position of a center with respect to the main scanning direction X.

According to the present embodiment, the reading positions in the reading section 50 in the main scanning direction X are every position from a first position αl to a Vth position αV. V is an integer greater than (N+10). V is a constant. Therefore, the nth nozzle Pn corresponds to an (n+10)th position α(n+10). That is, a position of the (n+10)th position α(n+10) in the main scanning direction X is substantially equal to the position of the nth nozzle Pn in the main scanning direction X. Therefore, according to the present embodiment, the first information 81 indicates that the nth nozzle Pn corresponds to the (n+10)th position α(n+10).

Next, the control device 90 will be described with reference to FIGS. 4 and 6 to 11.

The first computing section 91 will be described with reference to FIG. 6.

According to the present embodiment as illustrated in FIG. 6, an edge portion of the sheet S on one side of the main scanning direction X is located at an (r+10)th position α(r+10) when the sheet S passes through the reading section 50. Also, an edge portion of the sheet S on the other side of the main scanning direction X is located at an (s+10)th position α(s+10) when the sheet S passes through the reading section 50. Therefore, according to the present embodiment, the reading section 50 generates sheet data identifying that the location of the sheet S corresponds to an area from the (r+10)th position α(r+10) to the (s+10)th position α(s+10). s is an integer that is at least equal to 2. s is a constant. r is an integer that is greater than s and at most equal to N. r is a constant.

The first computing section 91 acquires the sheet data from the reading section 50. The first computing section 91 then computes positions of both of the edge portions of the sheet S in the main scanning direction X based on the sheet data. According to the present embodiment, the first computing section 91 computes the (r+10)th position α(r+10) and the (s+10)th position α(s+10) to respectively be the positions of the edge portions of the sheet S in the main scanning direction X.

Figure 7:
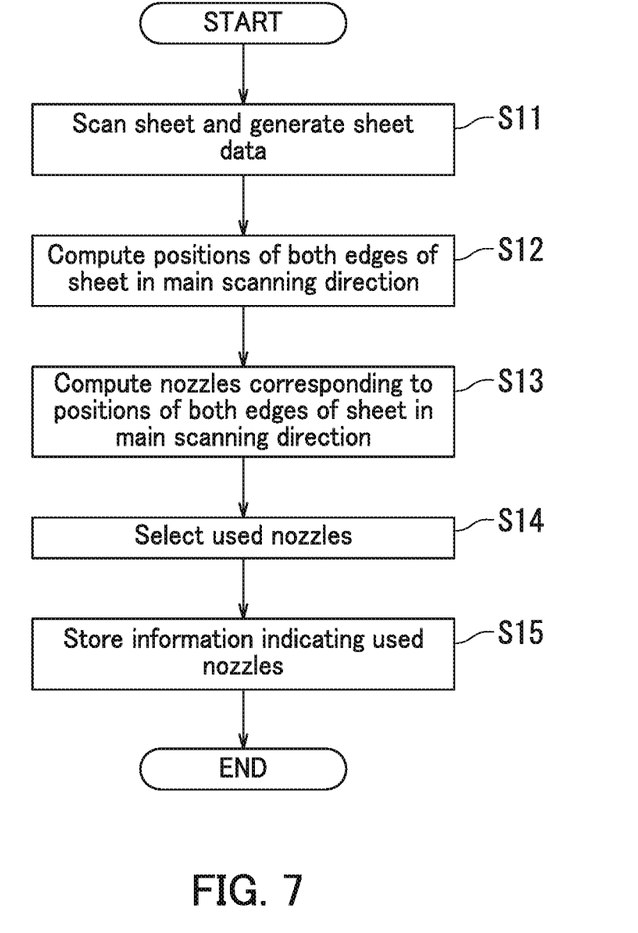
FIG. 7 is an example of a flowchart illustrating operation of a control device when a selection section selects a plurality of used nozzles.

Continuing, the selection section 92 will be described with reference to FIGS. 6 and 7. FIG. 7 is an example of a flowchart illustrating operation of the control device 90 when the selection section 92 selects the used nozzles PX.

As illustrated in FIGS. 6 and 7, the selection section 92 selects the used nozzles PX. In detail, the selection section 92 selects the used nozzles PX corresponding to a length of the sheet S in the main scanning direction X from the nozzles P based on the positions of both of the edge portions of the sheet S in the main scanning direction X and the first information 81.

The selection section 92 selects the used nozzles PX by the following procedure.

In Step S11, the reading section 50 scans the sheet S and generates the sheet data representing the sheet S.

In Step S12, the first computing section 91 computes the positions of both of the edge portions of the sheet S in the main scanning direction X based on the sheet data. According to the present embodiment, the first computing section 91 computes the (r+10)th position α(r+10) and the (s+10)th position α(s+10) to respectively be the positions of the edge portions of the sheet S in the main scanning direction X.

In Step S13, the selection section 92 acquires information indicating the positions of both of the edge portions of the sheet S in the main scanning direction X from the first computing section 91. The selection section 92 then computes a first corresponding nozzle and a second corresponding nozzle respectively corresponding to the positions of the edge portions of the sheet S in the main scanning direction X based on the positions of both of the edge portions of the sheet S in the main scanning direction X and the first information 81. The first corresponding nozzle corresponds to the position of one edge portion of the sheet S in the main scanning direction X. The second corresponding nozzle corresponds to the position of the other edge portion of the sheet S in the main scanning direction X.

According to the present embodiment, the rth nozzle Pr corresponds to the (r+10)th position α(r+10) in the first information 81. Accordingly, the selection section 92 computes the rth nozzle Pr to be the first corresponding nozzle. The sth nozzle Ps corresponds to the (s+10)th position α(s+10) in the first information 81. Accordingly, the selection section 92 computes the sth nozzle Ps to be the second corresponding nozzle.

In Step S14, the selection section 92 selects every nozzle P from the rth nozzle Pr (first corresponding nozzle) to the sth nozzle Ps (second corresponding nozzle) as the used nozzles PX.

In Step S15, the storage 80 stores information indicating the used nozzles PX (from the rth nozzle Pr to the sth nozzle Ps).

As described above with reference to FIGS. 6 and 7, the selection section 92 selects the used nozzles PX. Accordingly, unused nozzles PY can be excluded from an examination target for a non-ejecting nozzle. As a result, the nozzles that are the examination target are limited to the used nozzles PX able to eject ink on to the sheet S, and a non-ejecting nozzle can be precisely computed. The unused nozzles PY are nozzles other than the used nozzles PX from the nozzles P, and nozzles that eject ink to an area outside of the sheet S.

Figure 8:
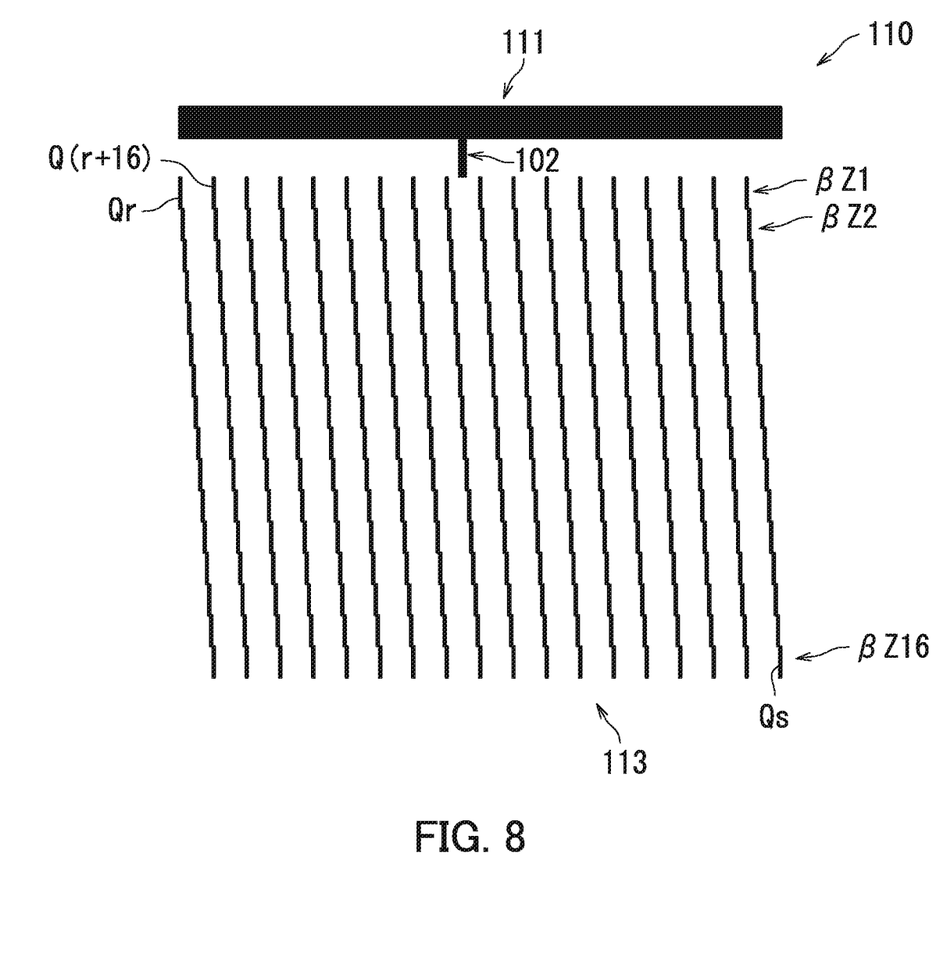
FIG. 8 is a diagram illustrating a mask image.
Figure 9:
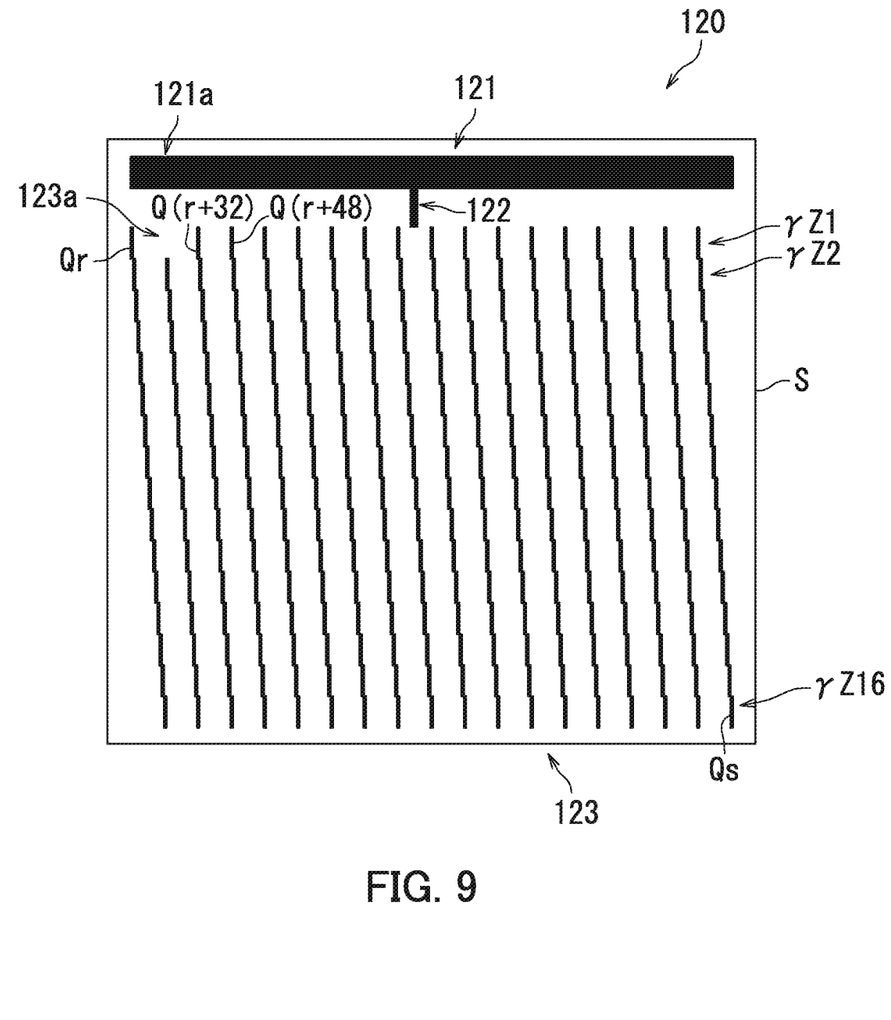
FIG. 9 is a diagram illustrating an examination image.

Next, the controller 93 will be described with reference to FIGS. 4, 6, 8 and 9. FIG. 8 is a diagram illustrating a mask image 110. FIG. 9 is a diagram illustrating an examination image 120.

As illustrated in FIGS. 8 and 9, the controller 93 directs the used nozzles PX to form the mask image 110 on the sheet S, thus forming the examination image 120 on the sheet S. To this end, the controller 93 directs the nozzles P to stop the unused nozzles PY from ejecting ink. That is, the controller 93 masks the unused nozzles PY. Accordingly, the controller 93 forms the examination image 120 on the sheet S using only the used nozzles PX among the nozzles P.

As illustrated in FIG. 6, the used nozzles PX of the present embodiment include every nozzle from the rth nozzle Pr to the sth nozzle Ps. The unused nozzles PY of the present embodiment include every nozzle from the first nozzle P1 to an (r−1)th nozzle P(r−1), and an (s+1)th nozzle P(s+1) to the Nth nozzle PN.

The mask image 110 will be described.

As illustrated in FIGS. 4 and 8, the mask image 110 indicates a part of the stored image 100 formed by the used nozzles PX. That is, the mask image 110 is an image from which edge portions of the stored image 100 in the main scanning direction X have been removed to fit an ink ejection region of the used nozzles PX.

The mask image 110 includes a second synchronized image 111, the first reference image 102, and a second pattern image 113.

The second synchronized image 111 indicates a part of the first synchronized image 101 formed by the used nozzles PX (from the rth nozzle Pr to the sth nozzle Ps).

The second pattern image 113 indicates a part of the first pattern image 103 in which a test pattern is formed for the used nozzles PX. According to the present embodiment, the second pattern image 113 indicates a part of the first pattern image 103 including every image portion from the rth image portion Qr to the sth image portion Qs. Therefore, according to the present embodiment, the second pattern image 113 includes every image portion from the rth image portion Qr to the sth image portion Qs.

The examination image 120 will be described.

As illustrated in FIGS. 8 and 9, the examination image 120 means an image formed on the sheet S by the used nozzles PX. Accordingly, the examination image 120 reflects a non-ejecting nozzle. That is, the examination image 120 does not include an image portion corresponding to the non-ejecting nozzle.

By contrast, the mask image 110 is an image formed in the storage 80 by the controller 93. Accordingly, the mask image 110 does not reflect the non-ejecting nozzle. That is, the mask image 110 includes an image portion corresponding to the non-ejecting nozzle.

The controller 93 directs the used nozzles PX to form the mask image 110, thus forming the examination image 120 on the sheet S. Accordingly, the examination image 120 is the same image as the mask image 110 when there is no non-ejecting nozzle among the used nozzles PX. By contrast, the examination image 120 is a different image than the mask image 110 when there is a non-ejecting nozzle among the used nozzles PX. Specifically, the examination image 120 is missing a portion of the mask image 110.

The examination image 120 includes a third synchronized image 121, a third reference image 122, and a third pattern image 123. The third synchronized image 121 is equivalent to the second synchronized image 111 of the mask image 110. The third reference image 122 is equivalent to the first reference image 102 of the mask image 110. The third pattern image 123 is equivalent to the second pattern image 113 of the mask image 110.

According to the present embodiment, an (r+16)th nozzle P(r+16) is a non-ejecting nozzle. Accordingly, a part 121*a* formed by the (r+16)th nozzle P(r+16) is missing from the third synchronized image 121. Also, an (r+16)th image portion Q(r+16) is missing from the third pattern image 123. Accordingly, a planned location 123*a* of the (r+16)th image portion Q(r+16) is blank.

Figure 10:
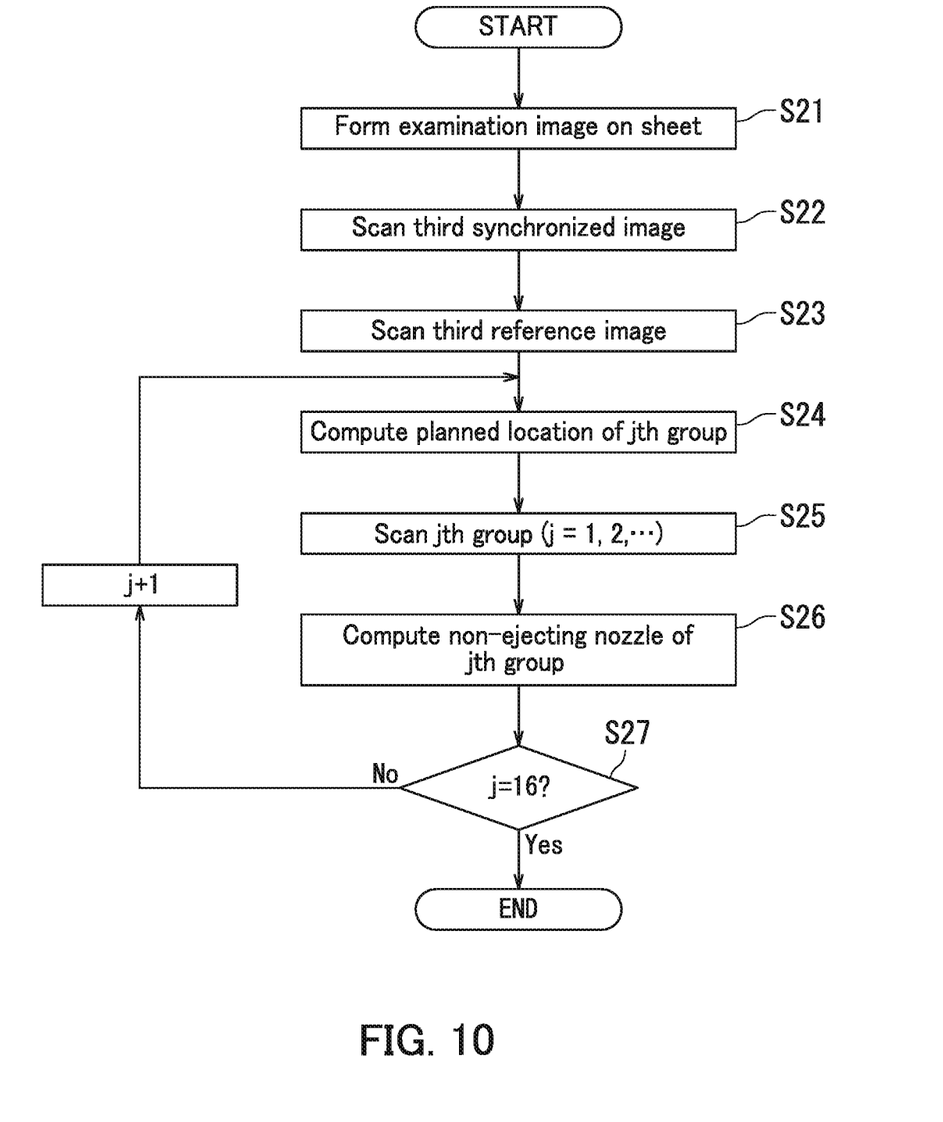
FIG. 10 is an example of a flowchart illustrating the operation of the control device when a second computing section computes a non-ejecting nozzle.

Next, a procedure by which the second computing section 94 computes a non-ejecting nozzle among the unused nozzles PY will be described with reference to FIG. 10. FIG. 10 is an example of a flowchart illustrating the operation of the control device 90 when the second computing section 94 computes a non-ejecting nozzle.

As illustrated in FIG. 10, the controller 93 directs the used nozzles PX to form the examination image 120 on the sheet S in Step S21.

In Step S22, the reading section 50 scans the third synchronized image 121 from the examination image 120 and generates first examination image data representing the third synchronized image 121. The second computing section 94 then acquires the first examination image data from the reading section 50. Upon acquiring the first examination image data, the second computing section 94 determines that the examination image 120 has reached the reading positions in the reading section 50.

In Step S23, the reading section 50 scans the third reference image 122 from the examination image 120 and generates second examination image data representing the third reference image 122. The second computing section 94 then acquires the second examination image data from the reading section 50. The second computing section 94 computes the position (pixel) of the third reference image 122 based on the second examination image data.

In Step S24, the second computing section 94 computes a position of a first group $\beta Z1$ in the mask image 110 based on the second information and the position of the third reference image 122 computed in Step S23. In detail, the second computing section 94 computes a planned location on the sheet S of the first group $\beta Z1$ of the mask image 110.

In Step S25, the reading section 50 scans a first group $\gamma Z1$ within the third pattern image 123 of the examination image 120 and generates third examination image data representing the first group $\gamma Z1$ of the examination image 120. The second computing section 94 then acquires the third examination image data from the reading section 50. According to the present embodiment, the first group $\gamma Z1$ of the examination image 120 includes the rth image portion Qr, an (r+32)th image portion Q(r+32), an (r+48)th image portion Q(r+48), . . . , but the first group $\gamma Z1$ is missing the (r+16)th image portion Q(r+16).

In Step S26, the second computing section 94 determines whether or not the first group $\gamma Z1$ acquired in Step S24 is located in the planned location on the sheet S computed in Step S23. In other words, the second computing section 94 compares the first group $\gamma Z1$ of the examination image 120 to the first group $\beta Z1$ of the mask image 110 to determine whether or not an image portion indicated by the first group $\beta Z1$ of the mask image 110 is missing from the first group $\gamma Z1$ of the examination image 120. The second computing section 94 then computes a non-ejecting nozzle of the first group $\gamma Z1$.

According to the present embodiment, the (r+16)th image portion Q(r+16) is missing from the first group $\gamma Z1$ of the examination image 120, and the planned location 123*a* of the (r+16)th image portion Q(r+16) is blank. In this case, the second computing section 94 computes an (r+16)th nozzle P(r+16) corresponding to the (r+16)th image portion Q(r+16) based on the third information 82. The second computing section 94 then computes that the (r+16)th nozzle P(r+16) is a non-ejecting nozzle.

Note that when there is no image portion missing from the first group $\gamma Z1$ of the examination image 120, the second computing section 94 computes that there is no non-ejecting nozzle in the first group $\gamma Z1$.

In Step S27, the second computing section 94 determines whether or not a process of computing a non-ejecting nozzle (Step S23 to Step S26) has been performed for every group from the first group $\gamma Z1$ to a 16th group $\gamma Z16$. When the process of computing a non-ejecting nozzle has not been performed for every group from the first group $\gamma Z1$ to the 16th group $\gamma Z16$ (No in Step S27), the process shifts to Step S24. When the process of computing a non-ejecting nozzle has been performed for every group from the first group $\gamma Z1$ to the 16th group $\gamma Z16$ (Yes in Step S27), the process ends. Accordingly, the process of computing a non-ejecting nozzle is performed for every group from the first group $\gamma Z1$ to the 16th group $\gamma Z16$ within the third pattern image 123. As a result, the second computing section 94 determines whether or not any nozzle from the rth nozzle Pr to the sth nozzle Ps respectively corresponding to every image portion from the rth image portion Qr to the sth image portion Qs is a non-ejecting nozzle.

As described above with reference to FIG. 10, the reading section 50 scans the examination image 120 to generate examination image data (first examination image data, second examination image data, and third examination image data) representing the examination image 120. The second computing section 94 then computes a non-ejecting nozzle that is unable to eject ink among the used nozzles PX based on the examination image data, the second information, and the third information 82. Accordingly, only the used nozzles PX capable of ejecting ink on to the sheet S among the nozzles P are examined for whether or not a nozzle is a non-ejecting nozzle. As a result, a non-ejecting nozzle can be computed with high precision.

In Step S21, the controller 93 directs the used nozzles PX to form the examination image 120 on the sheet S. That is, the unused nozzles PY are stopped from ejecting ink. Accordingly, the ink can be prevented from being deposited in the area outside of the sheet S.

In the stored image 100, the first reference image 102 is located in the center portion of the first pattern image 103 in the main scanning direction X. Accordingly, when a portion of the stored image 100 is removed and the mask image 110 is formed, the first reference image 102 can be prevented from being removed and thus not included in the mask image 110.

Figure 11:
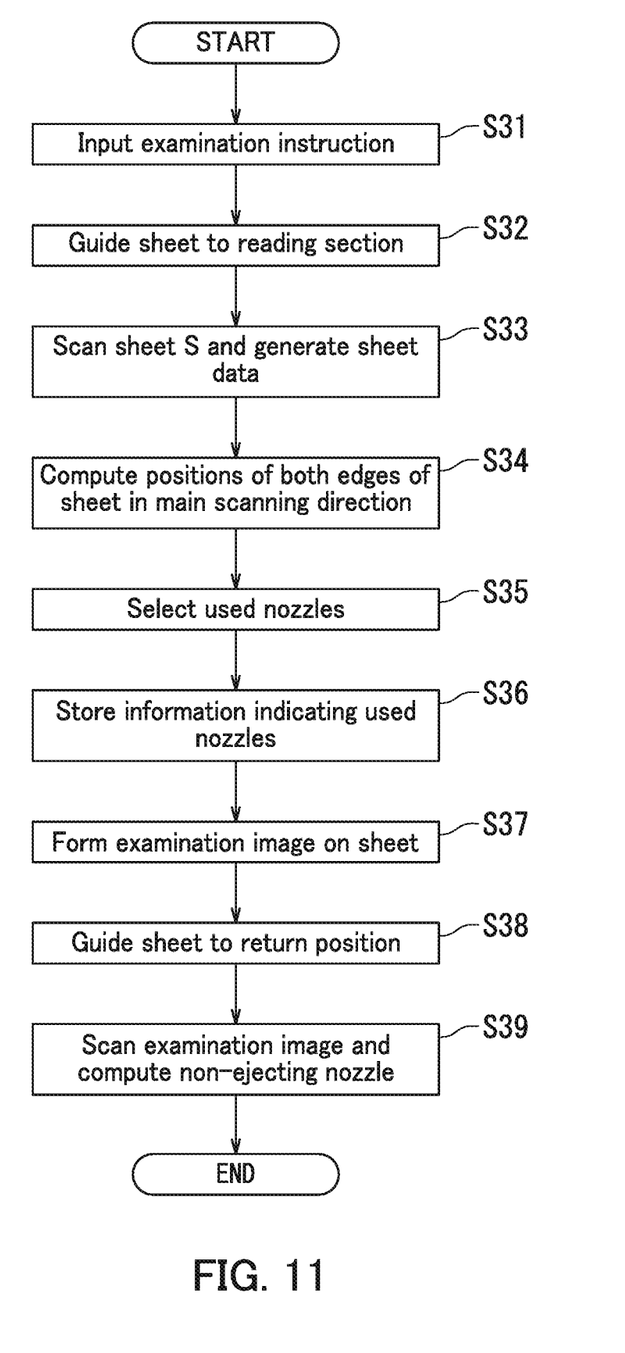
FIG. 11 is an example of a flowchart illustrating an operation sequence of the control device starting with an examination instruction being inputted to an input section and ending with the second computing section computing a non-ejecting nozzle.

Next, operation of the control device 90 will be described with reference to FIG. 11. FIG. 11 is an example of a flowchart illustrating an operation sequence of the control device 90 starting with an examination instruction being inputted to the input section 60 and ending with the second computing section 94 computing a non-ejecting nozzle.

As illustrated in FIG. 11, the input section 60 receives the input of the examination instruction in Step S31. The examination instruction means an instruction to examine for the presence of a non-ejecting nozzle.

In Step S32, the controller 93 directs the sheet guiding section 12 to guide the sheet S housed in the cassette 30 to the reading section 50.

In Step S33, the reading section 50 scans the sheet S and generates the sheet data (same as Step S11).

In Step S34, the first computing section 91 computes the positions of both of the edge portions of the sheet S in the main scanning direction X based on the sheet data (same as Step S12).

In Step S35, the selection section 92 selects the used nozzles PX (same as Step S13 to Step S14).

In Step S36, the storage 80 stores information indicating the used nozzles PX (same as Step S15).

In Step S37, the controller 93 directs the used nozzles PX to form the mask image 110 on the sheet S. As a result, the examination image 120 is formed on the sheet S (same as Step S21).

In Step S38, the controller 93 directs the second guiding section 19 to guide the sheet S with the examination image 120 formed thereon to the return position 11a. As a result, the sheet S is conveyed upstream from the nozzles P in the conveyance direction Y. Note that the controller 93 directing the second guiding section 19 specifically means that the controller 93 controls rollers equipped in the second guiding section 19 to guide the sheet S to the return position 11a.

In Step S39, the reading section 50 scans the examination image 120 to generate the examination image data representing the examination image 120. The second computing section 94 then computes a non-ejecting nozzle that is unable to eject ink among the used nozzles PX based on the examination image data, the second information, and the third information 82 (same as Step S22 to Step S27).

As described above with reference to FIG. 11, after the examination image 120 has been formed on the sheet S, the second guiding section 19 guides the sheet S to the return position 11a and the reading section 50 scans the examination image 120 in Step S37 to Step S39. Accordingly, the process of forming the examination image 120 on the sheet S, scanning the examination image 120, and computing a non-ejecting nozzle can be performed smoothly.

An embodiment of the present disclosure has been described above with reference to the drawings (FIGS. 1 to 11). However, the present disclosure is not limited to the above-described embodiment and can be practiced in various ways within the scope not departing from the gist of the present disclosure (in (1) to (4), for example). Elements of configuration disclosed in the above embodiment can be combined as appropriate to form various disclosures. For example, some of the elements of configuration in the embodiment may be omitted. The drawings schematically illustrate main elements of configuration to facilitate understanding. Aspects of the elements of configuration in the drawings such as a number thereof may differ from actual properties. The elements of configuration in the above embodiment are but one example and are not particularly limited. The elements of configuration may be altered in various ways within the scope not substantially departing from the effects of the present disclosure.

(1) According to the present embodiment, the reading section 50 scans the sheet S in the main scanning direction X and generates the sheet data representing the sheet S. In this case, the reading section 50 may scan a plurality of parts of the sheet S. The parts mean parts at different positions on the sheet S in the conveyance direction Y. Accordingly, the selection section 92 can select the used nozzles PX that correspond to the parts of the sheet S and obtain used nozzle information with respect to the conveyance direction Y. The used nozzle information indicates the used nozzles PX. As a result, even when the sheet S is tilted at an angle to the conveyance direction Y, the selection section 92 can select the used nozzles PX by taking into account the angle of the sheet S.

When the selection section 92 obtains the used nozzle information, the used nozzle information may be stored in the storage 80 only to reflect differences in the main scanning direction X downstream in the conveyance direction Y.

In the following, an example will be described in which the used nozzle information is stored in the storage 80 only to reflect differences in the main scanning direction X downstream in the conveyance direction Y. For example, the parts of the sheet S to be scanned by the reading section 50 include a first part, a second part, and a third part. The first part, the second part, and the third part are located in the stated order downstream in the conveyance direction Y. The used nozzle information of the second part is the same as the used nozzle information of the first part in the main scanning direction X, but the used nozzle information of the third part is different from the used nozzle information of the second part in the main scanning direction X. In this case, the storage 80 stores the used nozzle information of the first part and the used nozzle information of the third part, but does not store the used nozzle information of the second part. As a result, information stored in the storage 80 may be reduced, and capacity of the storage 80 can be used efficiently.

(2) According to the present embodiment, the unused nozzles PY are masked. As a result, the unused nozzles PY are not examined for whether or not a nozzle is a non-ejecting nozzle. However, when an examination for a non-ejecting nozzle is performed multiple times, all of the nozzles P can be examined for whether or not a nozzle is a non-ejecting nozzle. Specifically, the position of the sheet S in the main scanning direction X is changed each time the examination for a non-ejecting nozzle (the process illustrated in Step S31 to Step S39) is performed. For example, in a first examination, the sheet S is offset on one side from the center portion in the main scanning direction X. In a second examination, the sheet S is offset to the other side from the center portion in the main scanning direction X. As a result, when the first examination and the second examination are combined, all of the nozzles P are selected as the used nozzles PX. Therefore, all of the nozzles P can be examined for whether or not a nozzle is a non-ejecting nozzle.

(3) According to the present embodiment, the selection section 92 selects the used nozzles PX according to the sheet S. In this case the selection section 92 may select used nozzles PX by taking into account a printable area of the sheet S. That is, the used nozzles PX include nozzles that can deposit ink on to the printable area of the sheet S. As a result, the ink can be prevented from being deposited outside of the printable area of the sheet S when the examination image 120 is formed on the sheet S.

(4) According to the present embodiment, the stored image 100 includes the first synchronized image 101. However, the present disclosure is not limited thereto. The stored image 100 does not have to include a first synchronized image 101. That is, the stored image 100 may only include the first reference image 102 and the first pattern image 103. In this case, in Step S21, the controller 93 directs the used nozzles PX to form the first reference image 102 and the second pattern image 113 on the sheet S, thus forming the examination image 120 on the sheet S. As a result, the examination image 120 includes the third reference image 122 and the third pattern image 123, but does not include the third synchronized image 121. Then, the process in Step S22 (FIG. 10) is omitted. In Step S23, when acquiring the second examination image data from the reading section 50, the second computing section 94 determines that the examination image 120 has reached the reading positions in the reading section 50 and computes the position of the third reference image 122.

Accordingly, a first synchronized image 101 is omitted from the stored image 100, and the examination image 120 can be simplified.

What is claimed is:

1. An inkjet recording apparatus, comprising:
a plurality of nozzles configured to eject ink;
storage configured to store first information and first pattern image data representing a first pattern image;
a first reading section configured to scan a sheet to generate sheet data representing the sheet;
a first computing section configured to compute positions of both edge portions of the sheet in a main scanning direction based on the sheet data;
a selection section configured to select, from among the nozzles, a plurality of used nozzles corresponding to a length of the sheet in the main scanning direction based on the positions of both of the edge portions of the sheet in the main scanning direction and the first information; and
a controller configured to direct the used nozzles to form a second pattern image on the sheet, wherein
the first information indicates, from among the nozzles, a corresponding nozzle for each of a plurality of reading positions in the first reading section with respect to the main scanning direction,
the first pattern image exhibits a test pattern for the nozzles, and
the second pattern image exhibits a part of the first pattern image in which the test pattern for the used nozzles is formed.

2. The inkjet recording apparatus according to claim 1, wherein
the controller directs the nozzles to stop nozzles other than the used nozzles among the nozzles from ejecting ink.

3. The inkjet recording apparatus according to claim 1, wherein
the storage additionally stores second information and reference image data representing a reference image for establishing a position of the first pattern image,
the reference image is formed on the sheet, and is located downstream of the first pattern image in a conveyance direction of the sheet,
the second information indicates a position of the first pattern image relative to the reference image, and
the controller directs the used nozzles to form the reference image and the second pattern image on the sheet to form an examination image on the sheet, the examination image being an examination target image.

4. The inkjet recording device according to claim 3, wherein
the nozzles include every nozzle from a first nozzle to an Nth nozzle, N being an integer that is at least equal to 2,
the first pattern image includes every image portion from a first image portion to an Nth image portion,
an nth image portion indicates a part of the test pattern for an nth nozzle, n being an integer that is at least equal to 1 and at most equal to N, and
the storage additionally stores third information indicating that the nth image portion corresponds to the nth nozzle.

5. The inkjet recording device according to claim 4, further comprising:
a second reading section configured to scan the examination image to generate examination image data representing the examination image; and
a second computing section configured to compute, from among the used nozzles, a non-ejecting nozzle that is unable to eject ink based on the examination image data, the second information, and the third information.

6. The inkjet recording apparatus according to claim 5, further comprising:
a guiding section configured to guide the sheet that has passed the nozzles to a return position, wherein
the return position is located upstream of the nozzles in the conveyance direction, and
the first reading section is located between the nozzles and the return position, and functions as the second reading section.

* * * * *